(12) United States Patent
Hoffmann et al.

(10) Patent No.: US 11,186,203 B2
(45) Date of Patent: Nov. 30, 2021

(54) GEAR UNIT, ELECTRIC GEAR MOTOR AND SEAT

(71) Applicant: Adient Luxembourg Holding S.à r.l., Luxembourg (LU)

(72) Inventors: Andreas Hoffmann, Wülfrath (DE); Oliver Kuntz, Wermelskirchen (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 43 days.

(21) Appl. No.: 16/315,430

(22) PCT Filed: Jul. 5, 2017

(86) PCT No.: PCT/EP2017/066765
§ 371 (c)(1),
(2) Date: Jan. 4, 2019

(87) PCT Pub. No.: WO2018/007439
PCT Pub. Date: Jan. 11, 2018

(65) Prior Publication Data
US 2019/0232819 A1    Aug. 1, 2019

(30) Foreign Application Priority Data

Jul. 5, 2016  (DE) ............... 10 2016 212 256.8
Sep. 13, 2016  (DE) ............... 10 2016 217 449.5

(51) Int. Cl.
*B60N 2/02*       (2006.01)
*H02K 5/26*       (2006.01)
(Continued)

(52) U.S. Cl.
CPC ......... *B60N 2/0232* (2013.01); *F16H 57/025* (2013.01); *G05G 5/18* (2013.01);
(Continued)

(58) Field of Classification Search
CPC ......... F16H 57/025; F16H 2057/02034; F16H 2057/02026; F16H 2057/0227;
(Continued)

(56) References Cited

U.S. PATENT DOCUMENTS 5,771,516 A * 6/1998 Huang ................... B25B 21/00
                                                                7/100
9,416,864 B2 * 8/2016 Mueller .................... B25F 5/00
(Continued)

FOREIGN PATENT DOCUMENTS

CN      1954161 A      4/2007
CN    101987583 A      3/2011
(Continued)

OTHER PUBLICATIONS

China National Intellectual Property Administration, Chinese Office Action in application No. 201780041825.X, dated Feb. 3, 2021. 12 pages.

*Primary Examiner* — Patrick Cicchino
(74) *Attorney, Agent, or Firm* — Marshall & Melhorn, LLC

(57) ABSTRACT

A gear unit (G) includes a gear housing (2) with at least one locking component (2.4, 2.4') for a form and/or force-locking mounting of an electric motor (1) to the gear unit (G). The locking component (2.4, 2.4') is configured as a circumferential edge or flange collar (5), in which a number of undercuts (2.4.1, 2.4.1') are incorporated, in which the electric motor (1) can be locked by a form or force-locking connection. The gear housing (2) includes an additional locking unit (4) as an additional radial stop, which locking unit can be pressed into the locking component (2.4) to achieve a locked state. An electric gear motor (GM) includes at least one electric motor (1) and the gear unit (G). The locking component (2.4, 2.4') can be form and/or force-
(Continued)

lockingly connected to the motor locking element (A, A'). A seat (S) includes the electric gear motor (GM).

12 Claims, 18 Drawing Sheets

(51) Int. Cl.
  *H02K 7/116* (2006.01)
  *F16H 57/025* (2012.01)
  *F16H 57/02* (2012.01)
  *H01R 33/46* (2006.01)
  *G05G 5/18* (2006.01)
  *F16H 1/16* (2006.01)

(52) U.S. Cl.
  CPC .............. *H01R 33/46* (2013.01); *H02K 5/26* (2013.01); *H02K 7/1166* (2013.01); *B60N 2002/0236* (2013.01); *F16H 1/16* (2013.01); *F16H 2057/02034* (2013.01); *G05G 2505/00* (2013.01)

(58) Field of Classification Search
  CPC .. F16H 2057/0228; H01R 33/46; H01K 5/26; H01K 7/116
  See application file for complete search history.

(56) References Cited

U.S. PATENT DOCUMENTS

| 10,458,519 | B2* | 10/2019 | Guttenberger | F16H 57/023 |
| 2003/0177854 | A1* | 9/2003 | Haussecker | F16H 57/031 |
| | | | | 74/425 |
| 2008/0197733 | A1* | 8/2008 | Oberle | H02K 7/1166 |
| | | | | 310/89 |
| 2013/0319152 | A1* | 12/2013 | Bea | B25F 5/02 |
| | | | | 74/421 A |

FOREIGN PATENT DOCUMENTS

| CN | 204127279 U | 1/2015 |
| CN | 105690334 A | 6/2016 |
| DE | 103 19 187 A1 | 11/2004 |
| DE | 10319187 A1 | 11/2004 |
| DE | 10 2005 030 217 A1 | 1/2007 |
| DE | 10 2010 008 880 B3 | 7/2011 |
| DE | 10 2010 031 170 A1 | 1/2012 |
| DE | 102010031170 A1 | 1/2012 |

* cited by examiner

GEAR UNIT, ELECTRIC GEAR MOTOR AND SEAT

CROSS REFERENCE TO RELATED APPLICATIONS

This application is a United States National Phase Application of International Application PCT/EP2017/066765 filed Jul. 5, 2017, and claims the benefit of priority under 35 U.S.C. § 119 of German Applications 10 2016 212 256.8, filed Jul. 5, 2016 and 10 2016 217 449.5, filed Sep. 13, 2016, the entire contents of which are incorporated herein by reference.

TECHNICAL FIELD

The invention relates to a gear unit, which can be assembled with an electric motor.

The invention furthermore relates to an electric gear motor, comprising the aforementioned gear unit as well as an electric motor. The electric gear motor will also be referred to as an actuator in the following.

The invention furthermore relates to a seat.

BACKGROUND

An actuator generally comprises at least one electric motor and a gear unit. Such a gear motor or actuator serves for example for adjusting a seat, especially a vehicle seat, in various functions, such as a length, height, and tilt adjustment for example.

The adjusting of a position of the seat can be done manually for example by means of a lever and/or a handle or electrically by means of an actuator, which is operable via an operating element.

The inventions serve for attaching the electric motor to a gear unit or to a motor support means.

An electric motor and a gear drive unit for servo drives in a vehicle are known from DE 10 2010 031 170 A1.

A motor and gearing assembly, a motor housing and a gear housing assembly are known from DE 10 2005 030 217 A1.

SUMMARY OF THE INVENTION

The problem which the invention proposes to solve is to indicate a gear unit which is improved as compared to the prior art, an improved electric gear motor or actuator, and an improved seat with such an actuator.

A gear unit comprises at least one gear housing with at least one locking component for the form-fit and/or force-fit attachment of an electric motor to the gear unit. According to the invention, the gear housing comprises an additional locking unit as an additional radial stop, which can be pressed into the locking component to achieve a locked state. Both the additional locking unit and the locking component are thus components of the gear housing.

In this way, not only is the electric motor especially easily connectable to the gear unit, but it can also be placed especially easily in a locked state with it.

The gear unit according to the invention enables a flexible mounting of the electric motor and a simple additional fixation thereof in especially cramped structural spaces, since the electric motor can be designed with smaller dimensions and a smaller number of fastening elements. In particular, by means of the form fit a mounting of the electric motor on the gear unit or the support element can be simplified.

According to one preferred embodiment of the gear unit, the locking component is configured as a circumferential edge or flange collar, in which a number of undercuts are incorporated, in which the electric motor is lockable by means of a form fit or force fit. In this way, the electric motor is especially easily connectable to the gear unit and can be placed especially easily in one of many predeterminable positions, in which the additional locking unit can be pressed into the locking component for a locked state. The locked state is especially easy to bring about in this way.

The electric gear motor according to the invention comprises
at least one electric motor and
a gear unit according to the invention, wherein the locking component is connectable by form fit and/or force fit to the motor locking element. The electric motor comprises a fastening arrangement for fastening the electric motor on the gear unit or a support element, wherein the fastening arrangement comprises at least one motor locking element, wherein the motor locking element is configured such that a rotary position of the electric motor relative to the gear unit or to the support element is preadjustable and a preadjusted rotary position of the electric motor is lockable by means of a form fit or a force fit.

The locking can be accomplished at first by rotating the electric motor. Thus, the electric motor is held securely on the gearing or the support element in simple fashion by form fit and frictional locking. On account of the gear housing having an additional locking unit as an additional radial stop, which is fashioned as a separate element and can be pressed into the locking component for a locked state, the electric motor is firmly secured against rotation in a simple manner.

According to one embodiment of the electric gear motor, the at least one locking component is arranged on the gear housing of the gear unit. Preferably, the gear housing is arranged on a length adjusting unit of the seat. The structural space is very limited here, so that the arrangement of the electric motor with the fastening arrangement, comprising the locking component and the motor locking element, is especially simple.

According to another embodiment of the electric gear motor, the locking component comprises a number of detent elements for interlocking the electric motor with the gear unit, in particular the gear housing, or with the support element. By means of the detent elements, the electric motor can be fastened securely and reliably to the gear unit or to the support element, for example on the seat. The detent elements are preferably configured as undercuts on the gear housing.

According to another embodiment of the electric gear motor, the motor locking element is designed such that the electric motor is secured immovably in the axial direction and prevented from twisting by a torque lock.

According to another embodiment of the electric gear motor, the at least one motor locking element has a radially outward protruding contour, which is arranged at a front end of the electric motor, especially at a front end of an electric motor housing.

Preferably, a diameter of the contour is larger than an outer diameter of the electric motor housing.

The form fit can be realized especially easily by means of the contour. The contour may be formed as a single piece with a bearing plate of the electric motor housing, which closes off the electric motor housing at its end face and forms in a known manner a housing cover of the electric motor housing. Alternatively, the contour can also be formed as a single piece with the electric motor housing. It is also conceivable to produce the contour separately and to connect it to the electric motor housing, for example by a material bond.

A circumferential profile of the contour preferably has uniformly distributed segments which are in each case spaced apart from each other in a circumferential direction. These segments are, for example, semicircular or polygonal in shape with fillets. By means of the segments, a flexible arrangement of the electric motor relative to the seat is possible. As the motor locking element has several segments which are preferably formed in an identical manner, any desired rotary position of the electric motor relative to the seat can be adjusted, depending on the number of segments.

For example, the motor locking element has six segments, in which case the rotational gradation of the rotary position of the electric motor relative to the seat is 60°. That is, the electric motor can be arranged in six different rotary positions relative to the seat, the rotary positions each being offset from one another by an angle of 60° with respect to a motor axis of the electric motor. Alternatively, the motor locking element may also have fewer or more segments. The segments may be arranged symmetrically or asymmetrically to each other.

According to another embodiment of the electric gear motor, the locking unit is designed as a separate element. The locking unit is thus part of the gear housing, just like the locking component, but according to a first alternative it is neither formed as a single piece with the locking component nor connected by a material bond to the locking component. According to a second alternative, the locking unit is at first connected as a single piece and/or by a material bond to the locking component, wherein a predetermined breaking point is arranged between the locking unit and the locking component, which is at first broken by a preferably manual pressure on the locking unit, before the locking unit is forced in the direction of the electric motor into the locking component to produce the locked state.

According to another embodiment of the electric gear motor, the locking component has a recess whose size and shape corresponds to the size and shape of the locking unit such that the locking unit can be pressed in the direction of the electric motor in its longitudinal direction in order to produce the locked state. In this way, it is especially easy to produce the locked state.

According to another embodiment of the electric gear motor, the locking unit and the locking component are designed such that the locking unit can be pressed into the locking component, yet is secured against dropping out, and especially preferably both in the direction of the pressing in, i.e., in the direction of the electric motor, and in the opposite direction. For this, the locking unit and/or the locking component have a stop or several stops.

Preferably, the recess and the corresponding locking unit have a conical shape, so that the locking unit can be prevented from dropping out in at least one direction.

According to another embodiment of the electric gear motor, the locking unit is engageable in the recess of the locking component, i.e., in the locking component. The locked state is therefore especially secure and is not releasable again without a defined force, especially not without a special tool.

According to another embodiment of the electric gear motor, the locking unit and the locking component are configured to secure the electric motor immovably in an axial direction and prevented from twisting by a torque lock.

A seat according to the invention comprises an electric gear motor according to the invention. The gear unit or the support element comprises a locking component corresponding to the motor locking element, wherein the locking component is connectable by form fit and/or force fit, especially by friction locking, to the motor locking element. The locking component is thus a component of the fastening arrangement by means of which the electric motor is fixable by form fit and/or force fit, especially by friction locking, to the gear unit or the support element.

According to one embodiment of the seat according to the invention, the locking component according to a first alternative has a multiple-piece configuration and according to a second alternative has a single-piece configuration. If the locking component by which the motor locking element of the fastening arrangement is to be connected has a multiple-piece design, the electric motor can be connected during the assembly by form fit and by means of prestressing with no play to the support element of the seat or to the gear unit, especially to the gear housing. In the case of a single-piece locking component, the electric motor can be pushed axially into the gear unit, especially into the gear housing, or the support element and thus into the corresponding locking component, and then be connected by means of a rotational movement in form and/or force fit, especially by friction locking, to the gear housing or the support element.

Thus, a flexible arrangement of the electric motor relative to the gear unit, especially to the gear housing, or to the support element is possible, wherein no additional fastening elements such as flanges are needed. As a result, a usually cramped structural space can be optimally utilized. Furthermore, by means of the fastening arrangement a variable rotary position of an electric connector of the electric motor relative to the gear unit, especially to the gear housing, or to the support element is possible. This enables the use of electric motors with the most uniform possible position of the electric connector. Preferably, a rotational gradation of the rotary position of the electric connector in the installed position of the electric motor is possible with at most 60°. Especially preferably, a finer rotational gradation of less than 60° is possible. That is, the electric motor can be arranged in different rotary positions relative to the gear unit, especially to the gear housing, or to the support element, the rotary positions in each case being offset from each other by an angle of at most 60° with respect to a motor axis of the electric motor.

According to another embodiment of the seat according to the invention, the fastening arrangement forms a bayonet lock. This makes possible a quickly producible and then releasable mechanical connection between the electric motor and the gear unit, especially the gear housing, or the support element.

Exemplary embodiments of the invention shall be explained more closely with the aid of drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
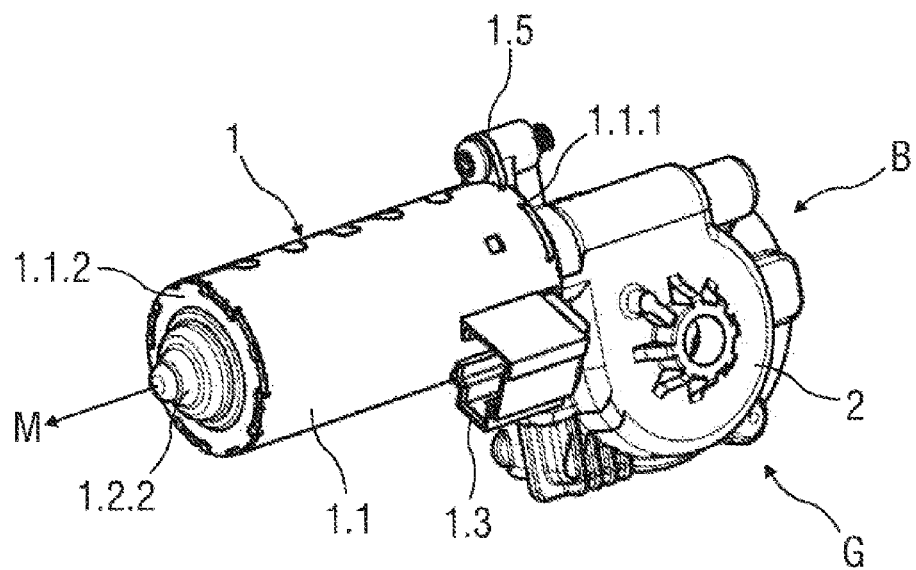
FIG. 1 is a schematic perspective view of a fastening arrangement of an electric motor on a gear housing according to the prior art.

Referring to the drawings, FIG. 1 shows in a perspective representation a fastening arrangement B of an electric motor 1 on a gear unit G according to the prior art. The electric motor 1 and the gear unit G form a gear motor or actuator for an adjusting unit, especially a seat adjusting unit, such as a height adjusting unit of the prior art.

Figure 2:
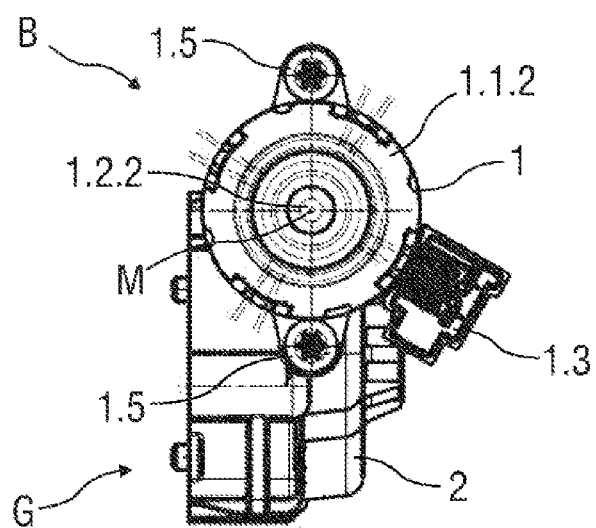
FIG. 2 is a schematic front view of the fastening arrangement of FIG. 1.

The gear unit G comprises at least one gear housing 2. FIG. 2 of the prior art shows a front view of the traditional fastening arrangement B of FIG. 1.

The electric motor 1 is for example a d.c. motor and it comprises a rotatably mounted rotor (not shown in detail) with a rotor shaft 1.4, which rotates about a motor axis M. The rotor is surrounded by a stator, likewise not shown. The rotor and the stator are situated in a common electric motor housing 1.1. Each front end of the electric motor housing 1.1 is formed by a bearing plate 1.1.1, 1.1.2 in the form of a housing cover.

Furthermore, at each front end of the electric motor housing 1.1 there is arranged a bearing journal 1.2.1, 1.2.2 positioned coaxially to the motor axis M. The bearing journals 1.2.1, 1.2.2 are each led through the corresponding bearing plate 1.1.1, 1.1.2 and protrude axially outward from said bearing plate 1.1.1, 1.1.2. The bearing journals 1.2.1, 1.2.2 each have a through opening, wherein the rotor shaft 1.4 is led through the bearing journal 1.2.1. The rotor shaft 1.4 faces toward the gear housing 2 of the gear unit G, which is connected to a gearing 3 arranged in the gear housing 2 (see FIG. 10). The electric motor 1 and the gearing 3 form in the connected state a gear motor.

For the electric power supply of the electric motor 1, it is provided with an electric connector 1.3. The electric connector 1.3 here is designed as a plug, which is connected to an outer circumference of the electric motor housing 1.1, in particular being interlocked with it. The electric connector 1.3 is connectable by means of certain connection components (not shown) to an on-board network of a vehicle in which the seat S is arranged.

For the fastening of the electric motor 1 on the gear housing 2 there are provided two flanges 1.5, each with a through opening. The flanges 1.5 are arranged on the power takeoff side of the electric motor 1 and protrude radially outward from the bearing plate 1.1.1. By way of the flanges 1.5, the electric motor 1 is connected in force fit to the gear housing 2. For example, connection elements are led through the through openings of the flanges 1.5, being situated on protrusions of the gear housing 2. The connection elements for example are connection pins, screws, bolts, etc.

Figure 20:
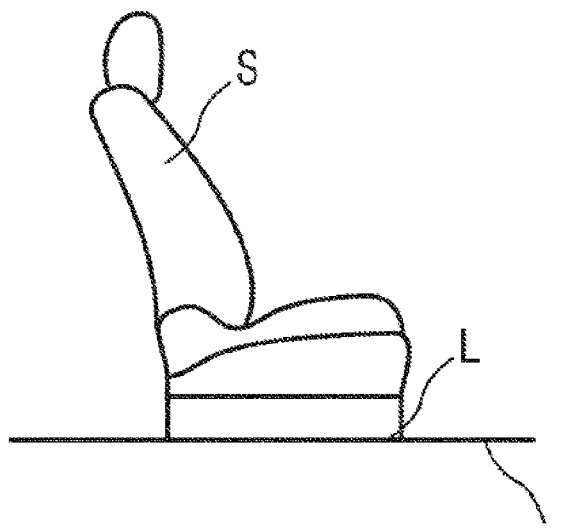
FIG. 20 is a schematic seat with a length adjusting unit.

The electric motor 1 and the gearing 3 in the connected state form for example a gear motor for executing a vertical movement of a seat S, for example, or a lengthwise movement of at least one upper rail O represented in FIG. 20, which is connected to a seat portion of the seat S. The gear motor for example as an actuator for a vertical movement drives the seat portion of the seat S and moves it up or down. Alternatively, the gear motor in an embodiment as an actuator for a lengthwise movement can drive the upper rail O and move it in a longitudinal direction relative to a lower rail (not shown) fixed to the vehicle.

On account of the flanges 1.5, which protrude radially outward from the bearing plate 1.1.1 of the electric motor housing 1.1 at the power takeoff side, a diameter of the electric motor 1 is enlarged in this area, so that a correspondingly large structural space is required for the arrangement of the gear motor.

Moreover, an installation position of the electric motor 1 in regard to a rotation and arrangement position relative to the gear housing 2 is firmly prescribed, so that a position, especially an angular position, of the electric connector 1.3 relative to the gear housing 2 is likewise firmly prescribed.

In order to reduce the structural space requirement for the gear motor and also for a flexible arrangement of the electric motor 1 at least in terms of a rotation and arrangement position relative to the gear housing 2, an alternative fastening arrangement B' is proposed, which shall be described more closely below.

The invention shall be described below with the aid of the fastening arrangement B' between electric motor 1 and gear unit G. Alternatively, the fastening arrangement B' may also be provided between the electric motor 1 and a not further represented support element of a seat S (see FIG. 20), wherein the support element of the seat S is equipped similarly, like the following described gear unit G, with a corresponding fastening component, especially a corresponding locking component 2.4.

Figure 3:
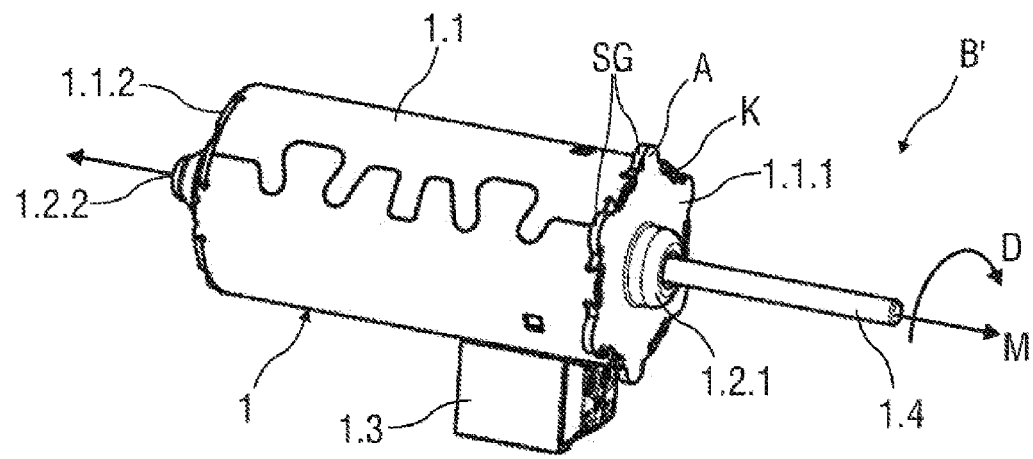
FIG. 3 is a schematic perspective view of an exemplary embodiment of an electric motor with a motor locking element.
Figure 4:
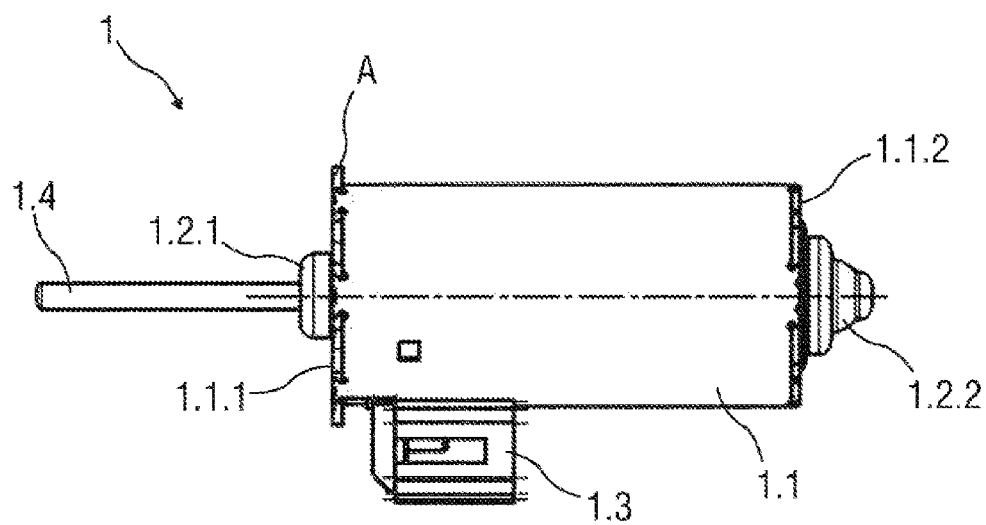
FIG. 4 is a schematic side view of the electric motor of FIG. 3.

For this, FIGS. 3 and 4 show an exemplary embodiment of an electric motor 1 without gear unit G, FIG. 3 showing the electric motor 1 in perspective view and FIG. 4 showing the electric motor 1 in side view.

The electric motor 1 comprises a motor locking element A, having a contour K, which protrudes radially outward from the electric motor housing 1.1. In particular, the motor locking element A is arranged at the front end of a power takeoff side of the electric motor 1. A diameter of the motor locking element A is larger than an outer diameter of the electric motor housing 1.1. Preferably, however, the motor locking element A protrudes only slightly beyond the outer diameter of the electric motor housing 1.1, so that the structural space requirement for the electric motor 1 is less than that of the electric motor 1 described in FIGS. 1 and 2.

The motor locking element A can be designed as a single piece with the bearing plate 1.1.1 of the power takeoff side of the electric motor 1, as shown for example in FIG. 3. Alternatively, the motor locking element A can also be designed as a single piece with the electric motor housing 1.1 and protrude from one edge, which is connected to the bearing plate 1.1.1. It is also conceivable for the motor locking element A to be a separate component, which is connected to the electric motor housing 1.1 and/or to the bearing plate 1.1.1, for example by a material bond.

An outer circumference of the motor locking element A has uniformly distributed segments SG, in order to make possible a flexible arrangement of the electric motor 1 relative to the gear housing 2. In the following, the motor locking element A shall be described more closely.

Figure 5:
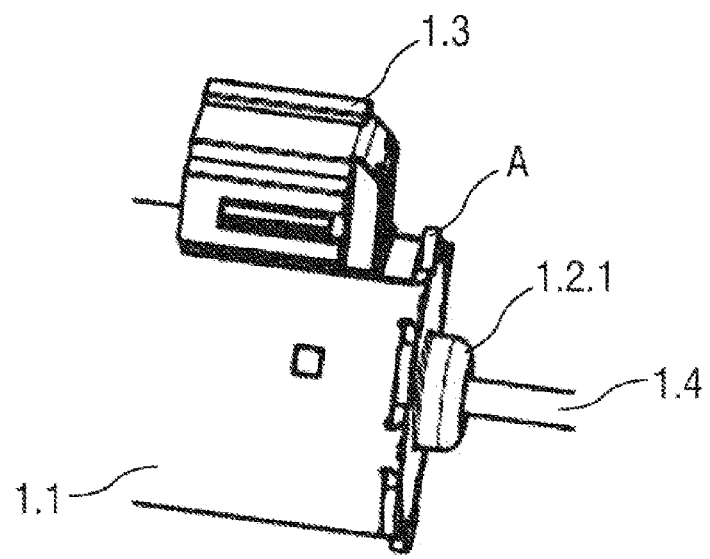
FIG. 5 is a schematic cutout view with the motor locking element and an electric connector of the electric motor of FIG. 3.
Figure 6:
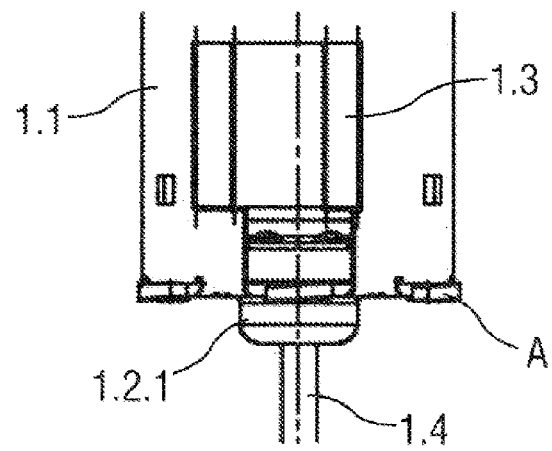
FIG. 6 is a schematic top view of the cutout in FIG. 5.
Figure 7:
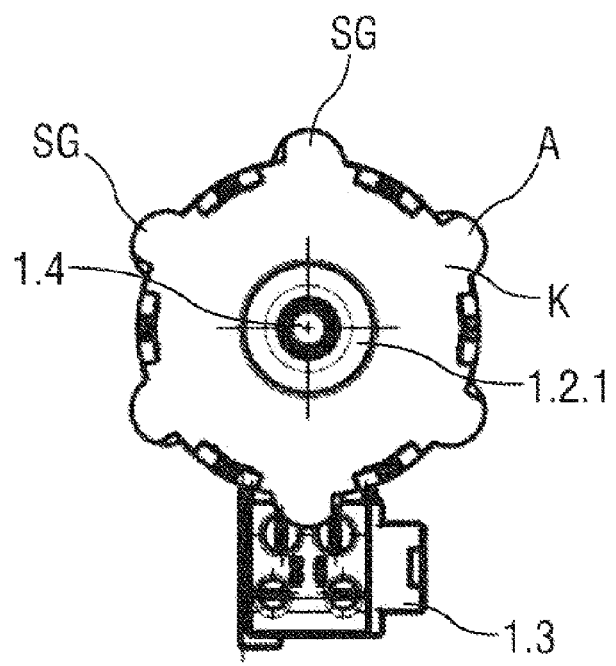
FIG. 7 is schematic front views of two different exemplary embodiments of an electric motor.
Figure 7:
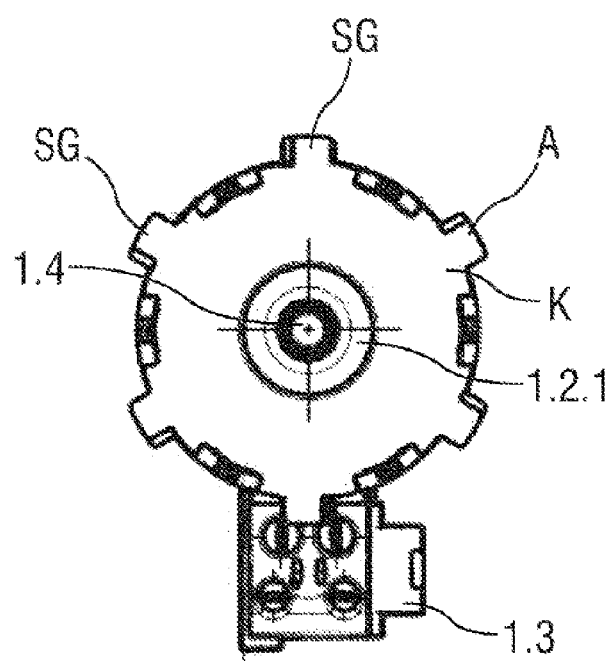

FIGS. 5 to 7 show exemplary embodiments of the motor locking element A, FIG. 5 showing in perspective view a cutout detail with the motor locking element A and the electric connector 1.3 of the electric motor 1. FIG. 6 shows a top view of the cutout detail of FIG. 5. FIG. 7 shows two different exemplary embodiments of an electric motor 1 with a motor locking element A.

In the exemplary embodiment of the electric motor 1 shown at the left, the motor locking element A has six semicircular segments SG, which are uniformly distributed about the outer circumference of the motor locking element A. In the exemplary embodiment of the electric motor 1 shown at the right, the motor locking element A has six rectangular segments SG, which are uniformly distributed about the outer circumference of the motor locking element A.

Figure 8:
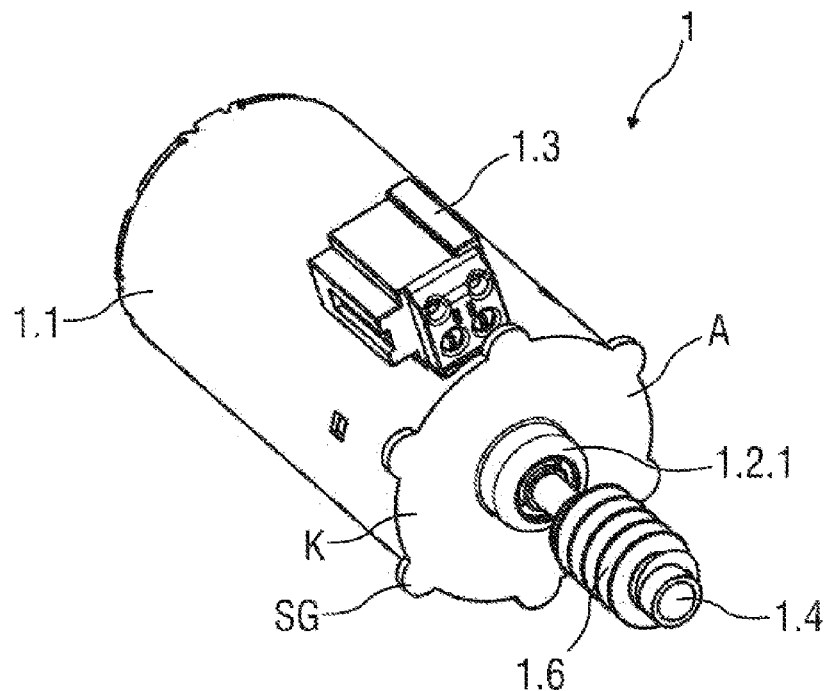
FIG. 8 is a schematic perspective representation of an exemplary embodiment of an electric motor with a motor locking element and a force transmitting element.
Figure 9:
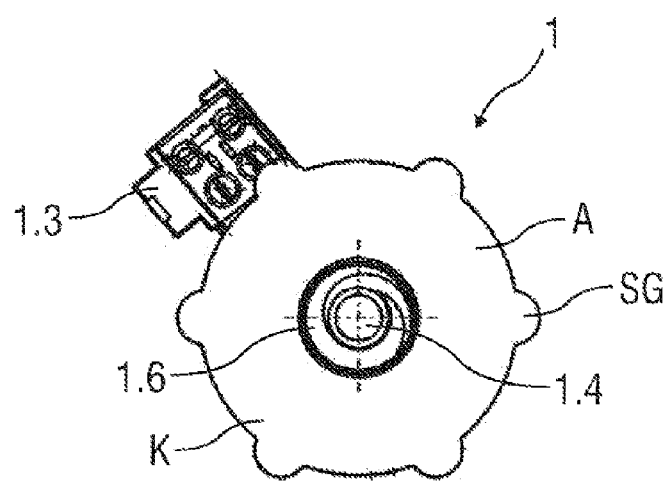
FIG. 9 is a schematic front view of the electric motor of FIG. 8.

FIGS. 8 and 9 show the exemplary embodiment of the electric motor 1 shown at the left in FIG. 7 in different views. In particular, FIG. 8 shows the electric motor 1 in perspective view, the rotor shaft 1.4 being provided with a force transmitting element 1.6, which in this case represents a thread for forming a spindle drive with the gearing 3. FIG. 9 shows the electric motor 1 of FIG. 8 in a front view.

Figure 10:
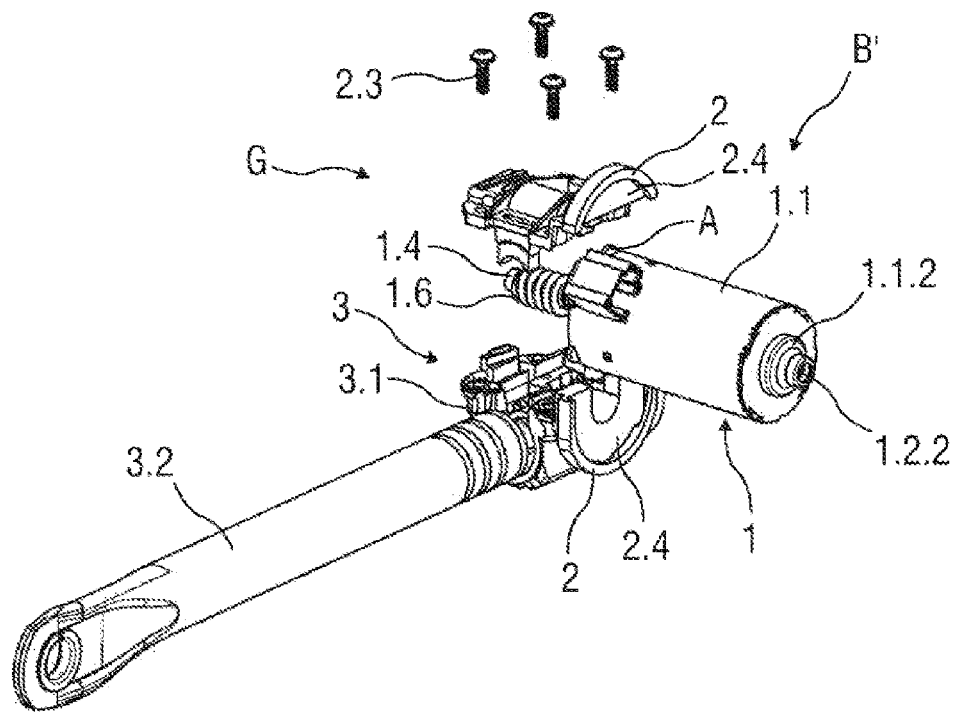
FIG. 10 is a schematic perspective view of an electric motor and a multiple-piece gear housing in a non-connected state.
Figure 11:
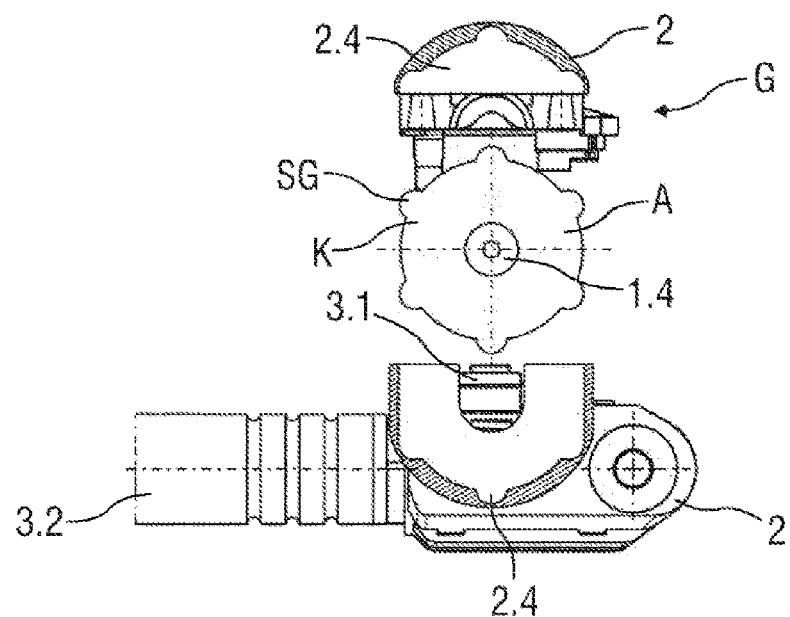
FIG. 11 is a schematic sectional representation of the electric motor and the gear housing of FIG. 10.

FIGS. 10 and 11 show the electric motor 1 of FIGS. 8 and 9 and the gear unit G, especially the gear housing 2, in a non-connected state. In particular, FIG. 9 shows the electric motor 1 of FIGS. 8 and 9 and the gear housing 2 in perspective view. FIG. 11 shows the electric motor 1 of FIGS. 8 and 9 and the gear housing 2 in a front view.

The gear housing 2 has a multiple-piece configuration and comprises two parts, which are joined together by a force fit. For this, in the present exemplary embodiment, four screws 2.3 are provided. Alternatively, other connection components can also be used.

The gear housing 2 receives the gearing 3 or at least a portion of the gearing 3, which forms together with the force transmitting element 1.6 on the rotor shaft 1.4 a spindle drive, for which a pinion 3.1 is arranged in the gear housing 2, which is connectable to the force transmitting element 1.6 and which is connected at the power takeoff side to a shaft 3.2, which in turn is connectable indirectly in a manner not shown to the upper rail O.

Moreover, the gear unit G, especially the gear housing 2, comprises a locking component 2.4 corresponding to the motor locking element A, in which the motor locking element A can engage in form fit and/or force fit, especially in a precision fit. For this, the locking component 2.4 is designed for example as the negative form of the motor locking element A. Moreover, the locking component 2.4 in the present exemplary embodiment is designed in two pieces.

As the motor locking element A has several segments SG which have an identical shape and are uniformly distributed about the outer circumference of the motor locking element A, various rotary positions D of the electric motor 1 relative to the gear housing 2 are possible, depending on the number of segments SG. The segments SG are formed as projecting lugs, tongues, or cams, and protrude radially from the motor locking element A.

For example, the motor locking element A has six segments SG, as shown for example in FIG. 11. The rotational gradation here for the rotary position D of the electric motor 1 and therefore that of the electric connector 1.3 in the installed position of the electric motor 1 relative to the gear housing 2 is 60°. That is, the electric motor 1 can be arranged in six different rotary positions D relative to the gear housing 2, the rotary positions D being offset from each other by an angle of 60° with respect to the motor axis M of the electric motor 1.

Alternatively, the motor locking element A may also have more than six segments SG, so that a finer rotational gradation is possible. For example, the motor locking element A has eight or ten segments SG.

In a mounting of the gear motor where the electric motor 1 is connected to the gear unit G, especially the multiple-piece gear housing 2, the electric motor 1 can be connected to the gear housing 2 by means of the motor locking element A and the two-piece locking component 2.4 by form fit and/or force fit, especially by friction locking, and free of play by means of prestressing. The prestressing is generated by screw fitting the gear housing 2.

Figure 12:
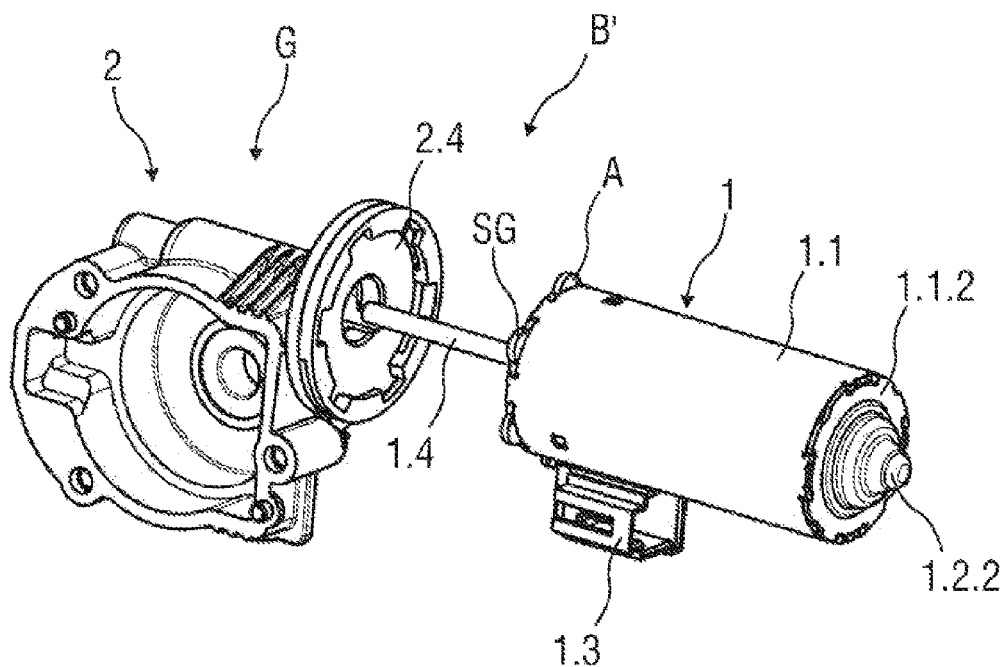
FIG. 12 is a schematic perspective view of an electric motor and a single-piece gear housing in a non-connected state.
Figure 13:
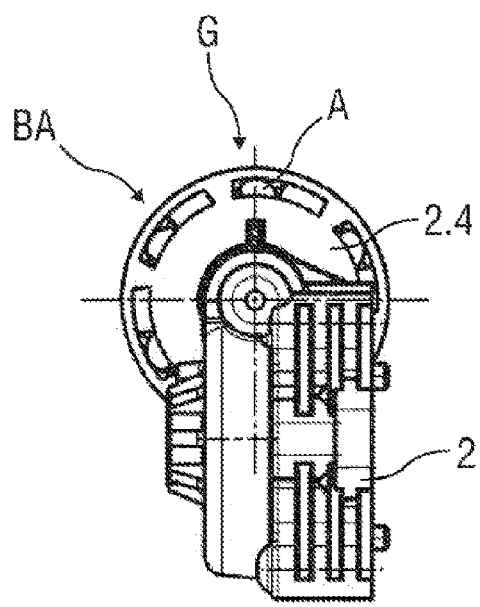
FIG. 13 is a schematic rear view of the electric motor and the gear housing of FIG. 12.

FIGS. 12 and 13 show the electric motor 1 and the gear housing 2 in each case in the non-connected state without the gearing 3 and the force transmitting element 1.6, which is part of the gearing 3. In particular, FIG. 12 shows the electric motor 1 and the gear housing 2 in perspective view. FIG. 13 shows a rear view of the electric motor 1 and the gear housing 2, the electric motor 1 being arranged behind the gear housing 2 in the direction of observation.

The gear housing 2 and thus the locking component 2.4 here are designed as a single piece.

Figure 14:
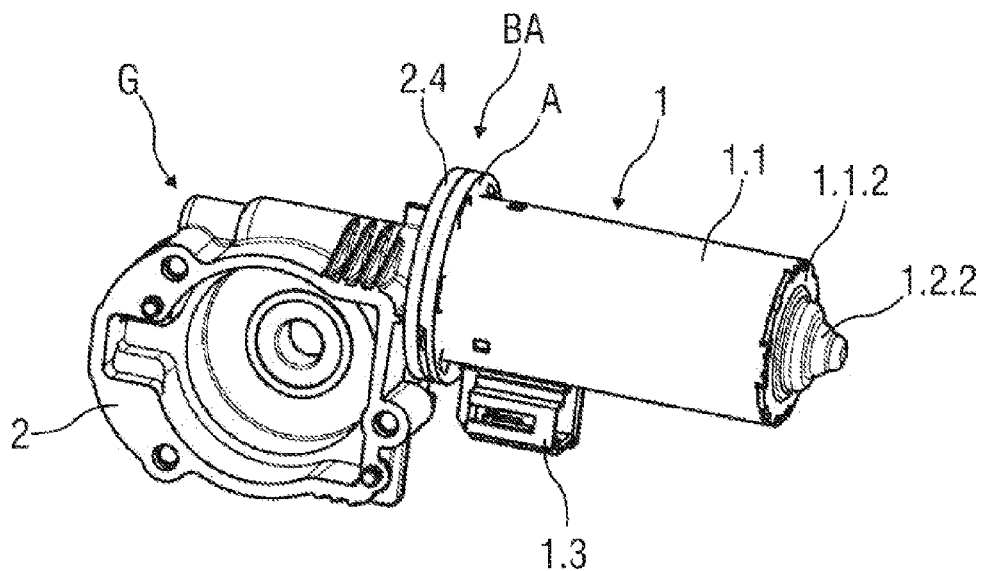
FIG. 14 is a schematic perspective representation of the electric motor and the gear housing of FIG. 12 in the connected state.
Figure 15:
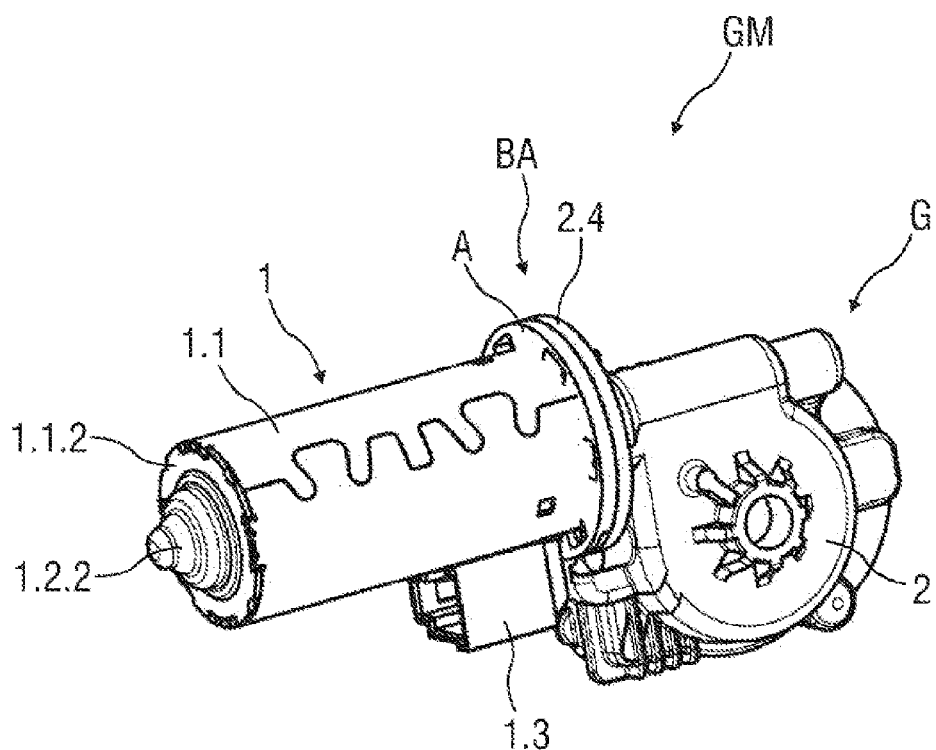
FIG. 15 is another schematic perspective representation of the electric motor and the gear housing of FIG. 12 in the connected state.

FIGS. 14 and 15 show an arrangement of the electric motor 1 on the gear unit G, especially on its gear housing 2, which form in the assembled state an electric gear motor GM. The gear housing 2 in this case has a single-piece design and is connected to the force transmitting element 1.6. The gearing 3 is not shown, for reasons of clarity. In particular, FIG. 14 shows the electric motor 1 and the gear housing 2 in perspective view with an inside of the gear housing 2. FIG. 15 shows the electric motor 1 and the single-piece gear housing 2 in perspective view with an outside of the gear housing 2.

Figure 16:
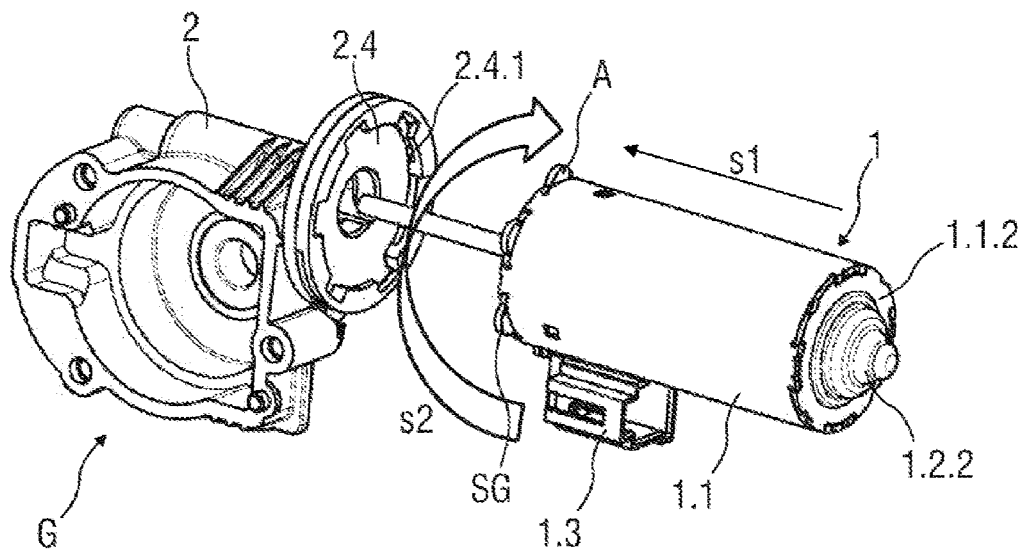
FIG. 16 is a schematic perspective view of the electric motor during its fastening to the gear housing.

FIG. 16 shows in perspective view the electric motor 1 and the single-piece gear housing 2 during the assembly process, wherein the gearing 3 is not shown for reasons of clarity.

The electric motor 1 is pushed axially into the gear housing 2 in a first arrow direction s1 until the motor locking element A abuts against the locking component 2.4. After this, the electric motor 1 is rotated in a second arrow direction s2 until the motor locking element A is received in form fit and/or force fit in the locking component 2.4. By means of a plurality of detent elements R, the form fit and/or force fit connection between the motor locking element A and the locking component 2.4 can be interlocked. The motor locking element A and the locking component 2.4 form here a bayonet lock BA.

Figure 17:
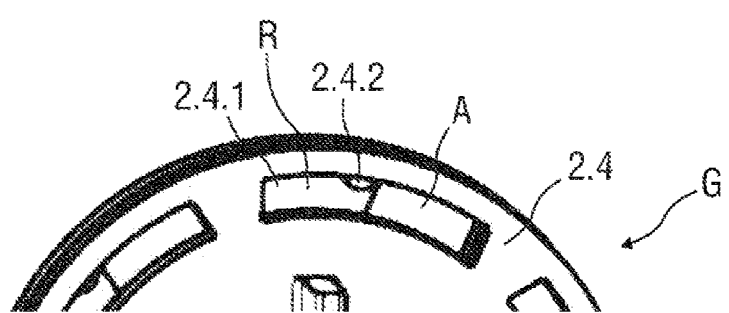
FIG. 17 is a schematic perspective view of a cutout view with a gear housing section with a locking component and a detent lug.

The detent elements R in the present exemplary embodiment are formed by means of undercuts 2.4.1 in the locking component 2.4, as shown for example by FIGS. 16 and 17.

FIG. 17 shows in perspective view a partial rear view of the locking component 2.4 with undercuts 2.4.1, each of which is provided with a detent lug 2.4.2. In particular, one side of the locking component 2.4 is shown, facing away from the electric motor 1.

During the assembly process, the motor locking element A is interlocked in the undercuts 2.4.1 by means of rotating the segments SG. Alternatively, an interlocking can also be ensured by a slight rotation of the segments SG of the motor locking element A, where the motor locking element A is rotatable relative to the electric motor housing 1.1.

Figure 18:
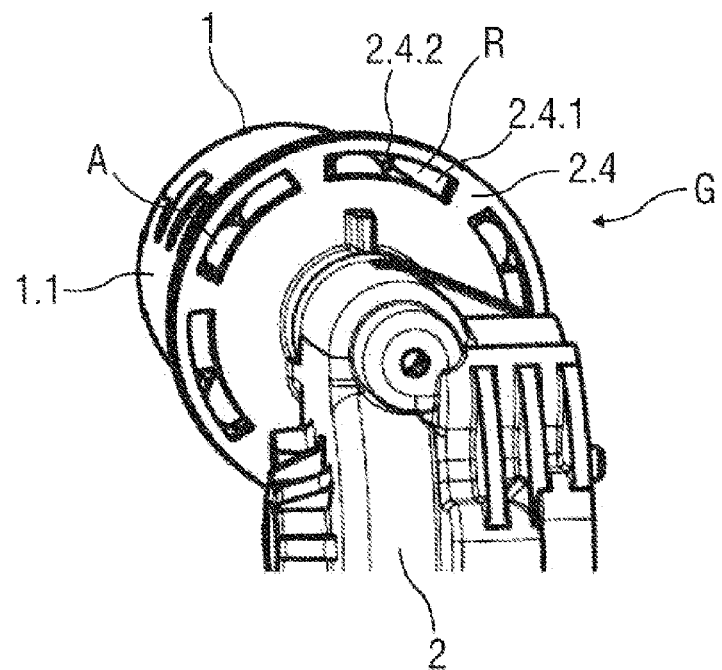
FIG. 18 is a schematic perspective view of the electric motor and the gear housing with the locking component of FIG. 17 in the connected state.

FIG. 18 shows in perspective view a rear view of the electric motor 1 and the gear housing 2 in the connected state, the electric motor 1 being arranged behind the gear housing 2 in the direction of observation.

Figure 19:
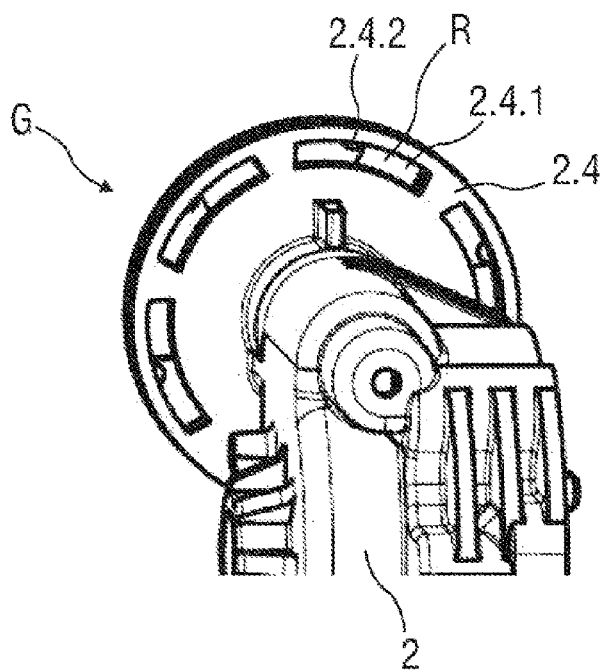
FIG. 19 is a schematic perspective view of the gear housing with the locking component of FIG. 17.

FIG. 19 shows in perspective view a rear view of the gear housing 2 without the electric motor 1.

FIG. 20 shows a seat S with a length adjusting unit L, the seat S being for example a vehicle seat.

FIGS. 21 to 25 show schematically in different views a further exemplary embodiment for a fastening arrangement B" of an electric gear motor GM.

Figure 21:
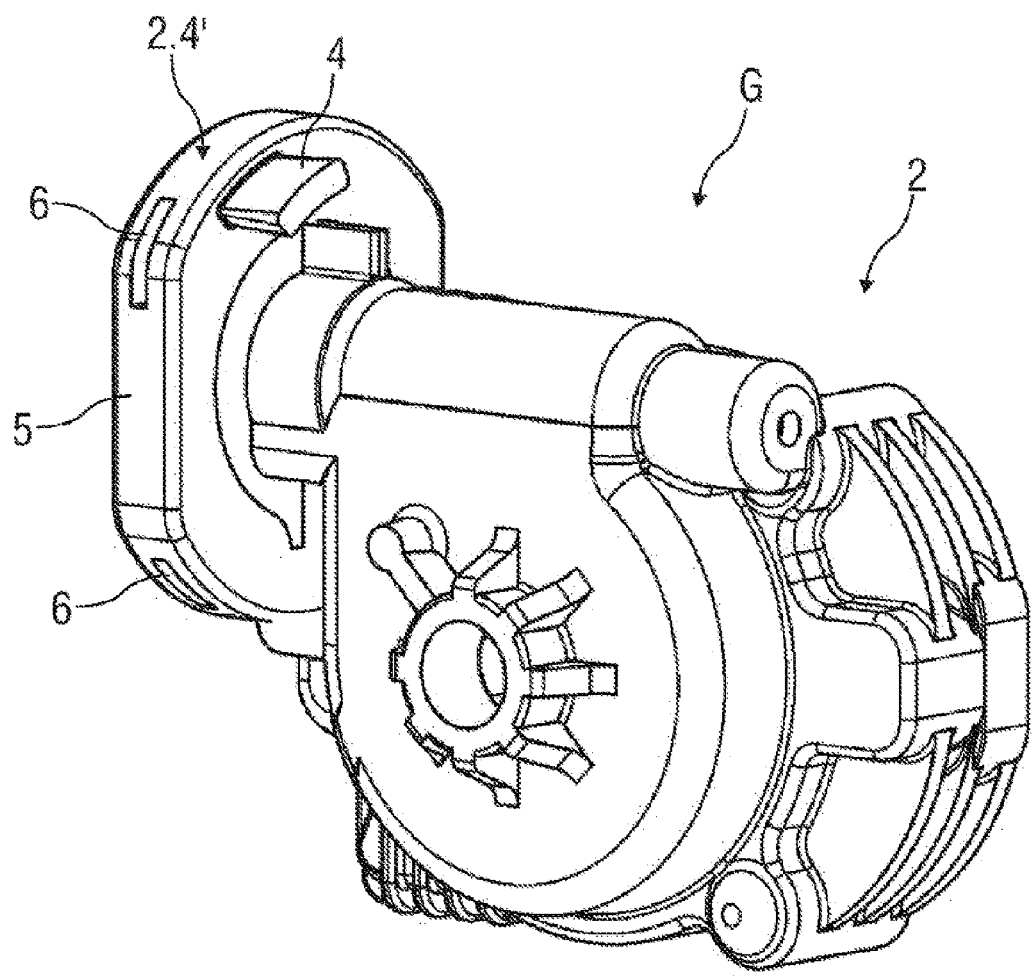
FIG. 21 is a schematic perspective view of another exemplary embodiment of a fastening arrangement B with an alternative motor locking element and an alternative locking component.

FIG. 21 shows the gear housing 2 with an additional locking unit 4. The locking unit 4 is configured as an additional lock pin or a lug or tongue projecting from the gear housing 2. The locking unit 4 is designed as a separate element, which is held on the gear housing 2 in form fit or force fit, for example being plugged in and locked.

The locking unit 4 serves as an additional radial stop. In this way, the electric motor 1 is fixable in the radial direction in a non-rotatable manner. For this, the locking unit 4 facing away from the electric motor 1 and protruding from the locking component 2.4' is configured such that, in the assembled state of gear unit G and electric motor 1, it can be pressed in the direction of the electric motor 1 into the locking component 2.4', especially into the flange collar 5, so that the closure, especially the bayonet lock BA', is locked and cannot be opened. For this, the locking unit 4 in the locked state not shown here projects beyond the side of the locking component 2.4' facing toward the electric motor 1, also not shown here.

The gear housing 2 comprises an alternative locking component 2.4' to receive and lock in form fit and/or force fit an alternative motor locking element A', which is designed in a corresponding manner to the alternative locking component 2.4'.

The locking component 2.4' here has a lengthened flange collar 5. There may optionally be arranged in the flange collar 5 one or more encircling slots 6. The slot or slots 6 serve in particular for a visual checking and indication of the locking of the motor locking element A' in the locking component 2.4' and thus for indication of the locked state.

Figure 22A:
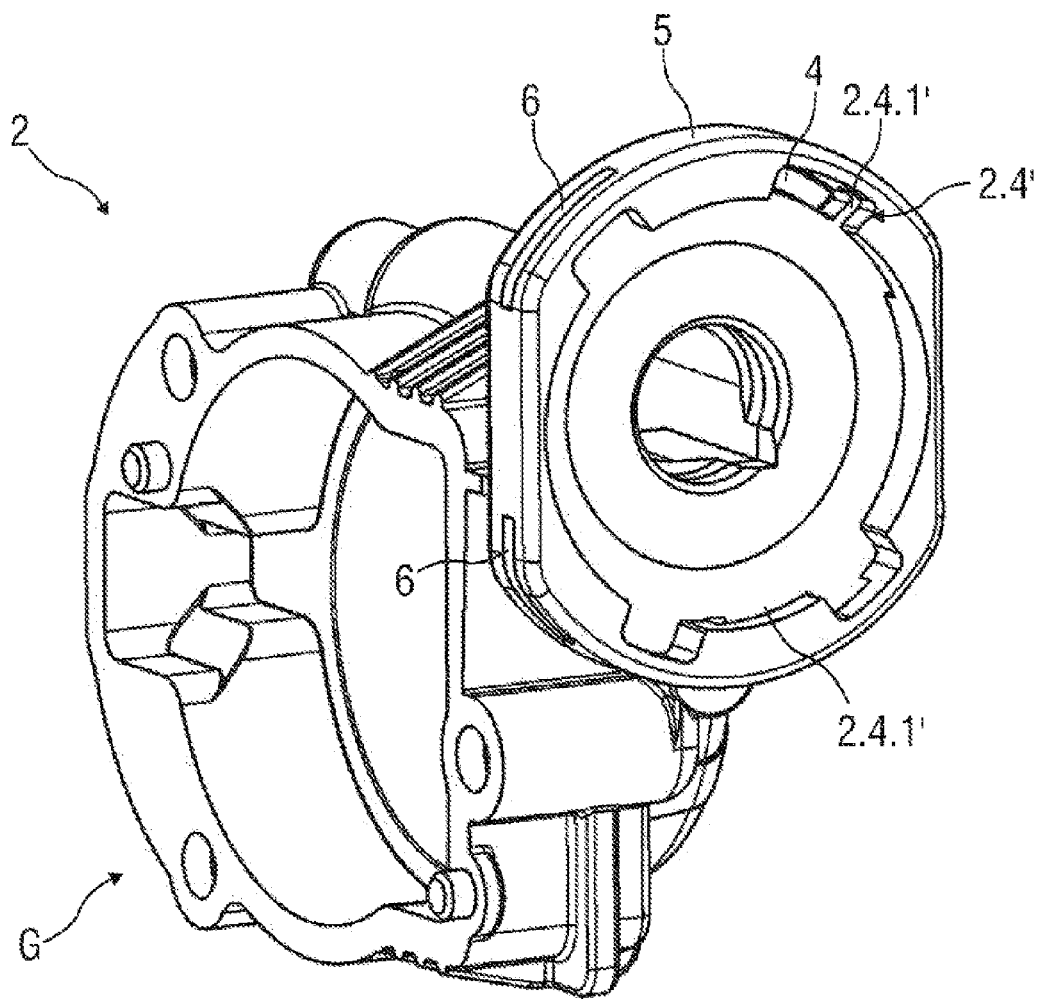
FIG. 22A is a schematic perspective view of the exemplary embodiment of FIG. 21.
Figure 22B:
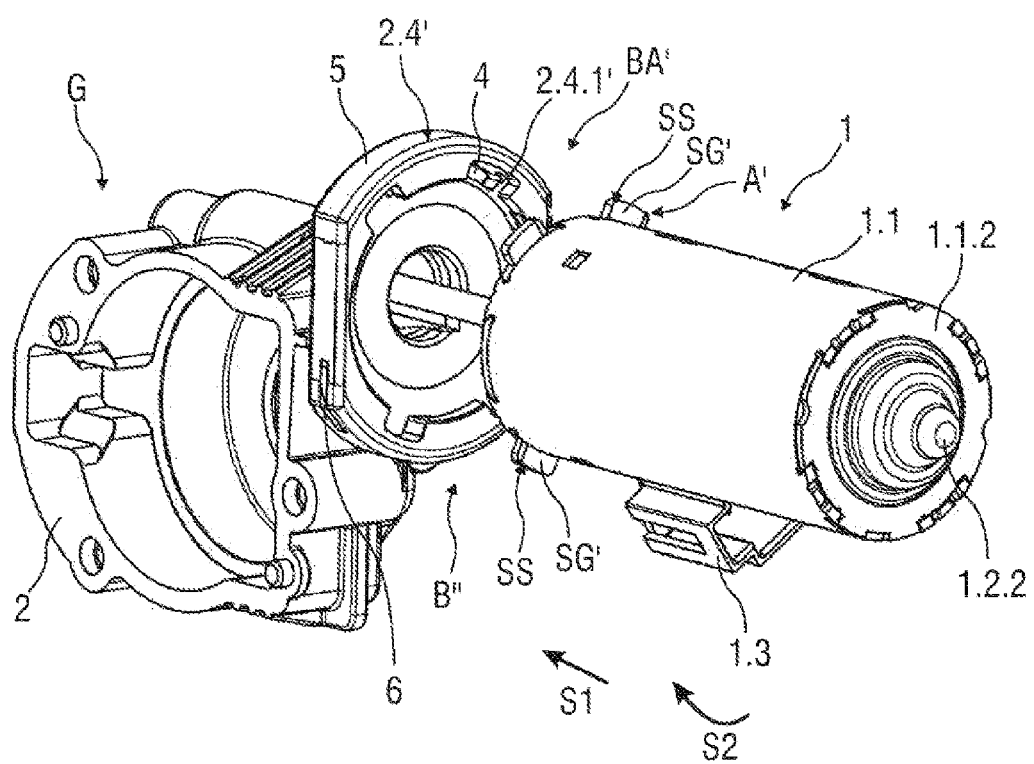
FIG. 22B is a schematic perspective view of the exemplary embodiment of FIG. 21.
Figure 22C:
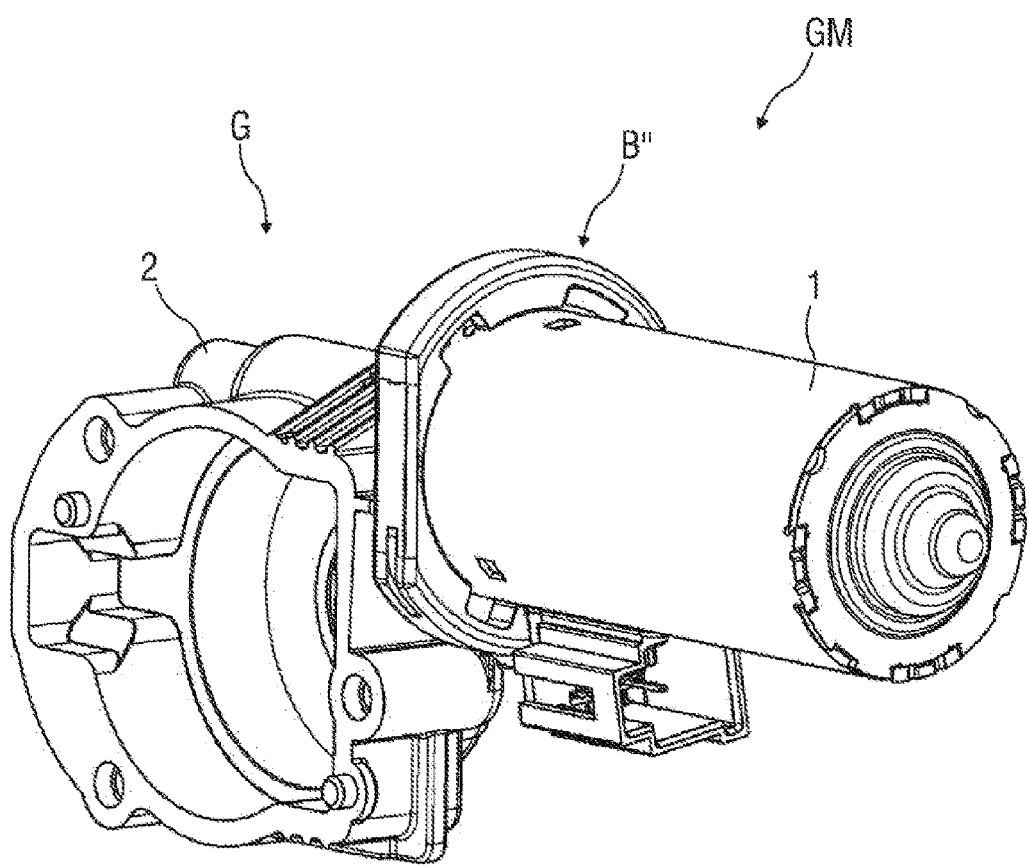
FIG. 22C is a schematic perspective view of the exemplary embodiment of FIG. 21.

FIGS. 22A to 22C show the alternative fastening arrangement B" with the alternative locking component 2.4' and the alternative motor locking element A' in detail. The fastening arrangement B" here has four segments SG' instead of six segments SG, especially detent tongues or detent lugs.

FIG. 22A shows the gear housing 2 with the alternative locking component 2.4', comprising the flange collar 5 with the slots 6. The locking component 2.4' has undercuts 2.4.1', in which the segments SG' engage in a locking manner by rotation. The number of undercuts 2.4.1' corresponds to the number of segments SG'. The segments SG' here, for example projecting lugs, cams, or tongues, are held by friction force in the respective undercut 2.4.1'. In addition, detent elements R, such as detent lugs, detent hooks or detent ribs, can be arranged in the respective slot-shaped undercut 2.4.1', in which the segments SG' additionally engage in form fit, especially in a locking manner.

The undercuts 2.4.1' can be formed in the region of the optional slots 6 of the locking component 2.4'. Thus, in the engaged state when the respective segment SG' is arranged in the corresponding undercut 2.4.1', especially being held in form fit and/or force fit, for example in a locking manner, an outer end face SS of the segment SG' is visible through the corresponding slot 6. For this purpose, the outer end face SS can be marked for example, especially in color.

The locking unit 4 in the non-locked state shown here still projects beyond the side of the locking component 2.4' facing away from the electric motor 1, not shown here, as in the previously described FIG. 21.

FIG. 22B shows the gear unit G and the electric motor 1 before being assembled. The electric motor 1 is pushed axially according to the arrow direction s1 into the gear housing 2, until the motor locking element A' abuts against the locking component 2.4'. Then the electric motor 1 is rotated in the arrow direction s2, until the motor locking element A' is locked by form fit and/or force fit in the locking component 2.4', especially in the undercut 2.4.1'. The motor locking element A' and the locking component 2.4' of the gear unit G form here a bayonet lock BA'. The locking unit 4 in the non-locked state shown here still projects beyond the side of the locking component 2.4' facing away from the electric motor 1, as in the previously described FIG. 22*a*.

Figure 23A:
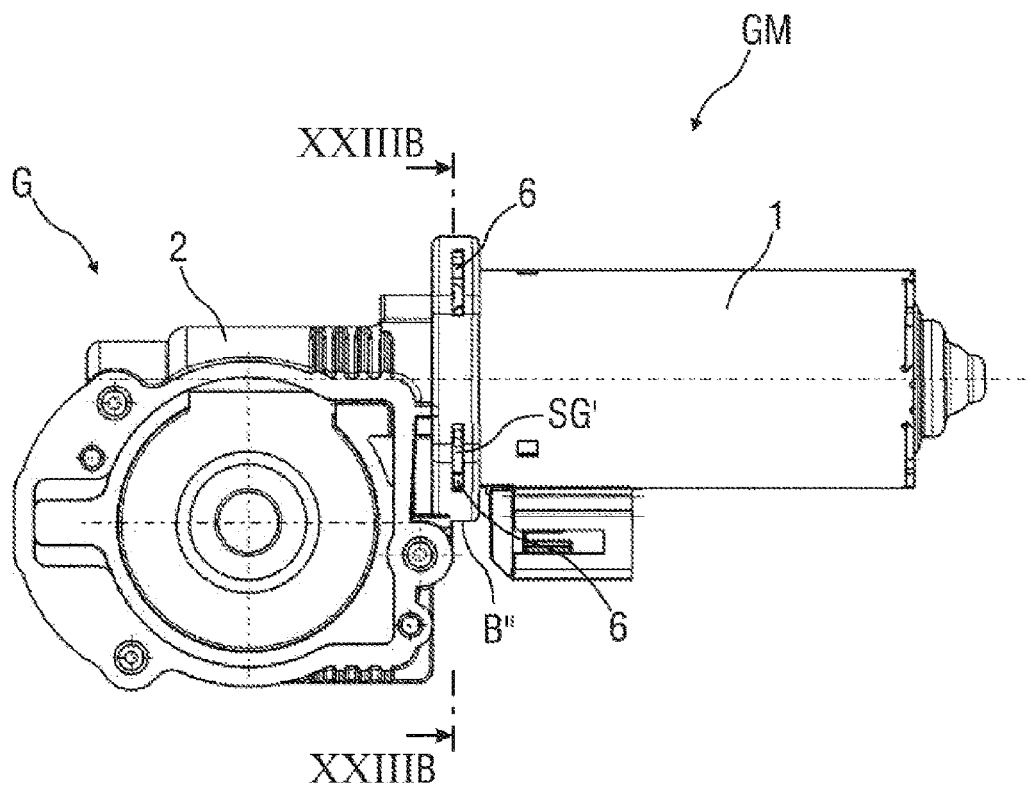
FIG. 23A is a schematic side view of the exemplary embodiment of FIG. 21.
Figure 23B:
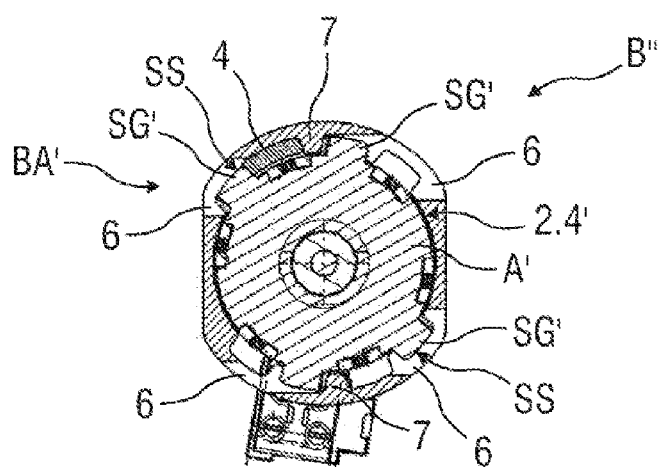
FIG. 23B is a schematic sectional view, taken along line XXIIIB of FIG. 23A, of the exemplary embodiment of FIG. 21.

FIG. 22C to 23B show the gear unit G and the electric motor 1 in the locked state of the fastening arrangement B" in various views. FIG. 22C shows a perspective view and FIGS. 23A and 23B show a side view and a sectional view in the region of the fastening arrangement B".

As shown in FIG. 23B, only two segments SG' of the motor locking element A', especially segments situated opposite each other, are arranged in the undercut 2.4.1' of the locking component 2.4' such that they are visible from the outside through the corresponding slot 6 in the flange collar 5 of the locking component 2.4'. The other two oppositely situated segments SG' are arranged in the respective undercut 2.4.1' such that they abut against a stop 7 of the locking component 2.4' and limit the locking movement of the electric motor 1. In addition, the electric motor 1 is secured and locked in the rotational direction by means of the bayonet lock BA'.

The locking unit 4 can be placed between the two above-indicated segments SG' of the motor locking element A' such that the motor locking element A' is lockable or is locked in the bayonet lock BA'.

Figure 24:
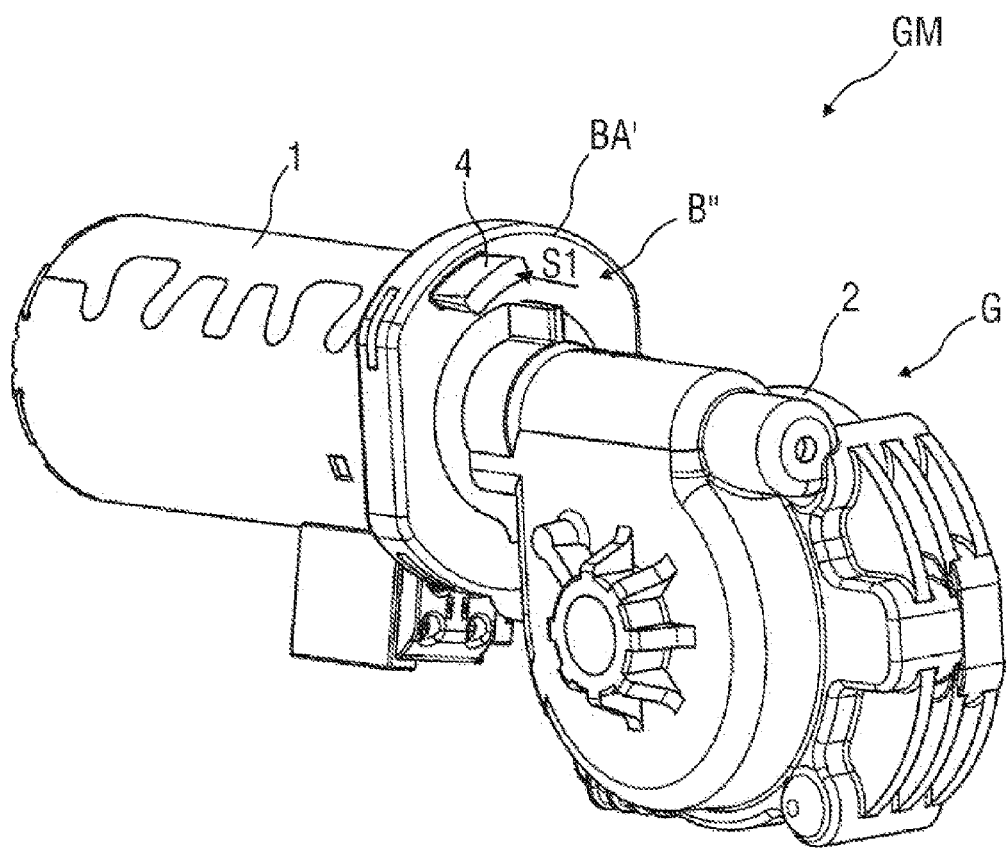
FIG. 24 is a schematic perspective view of the exemplary embodiment of FIG. 21.

FIG. 24 shows the electric gear motor GM, especially the gear unit G and the electric motor 1 with the additional locking unit 4 in the assembled and not yet locked state. In order to arrive at the locked state, the locking unit 4 must be pressed in the direction of the first arrow direction s1.

Figure 25:
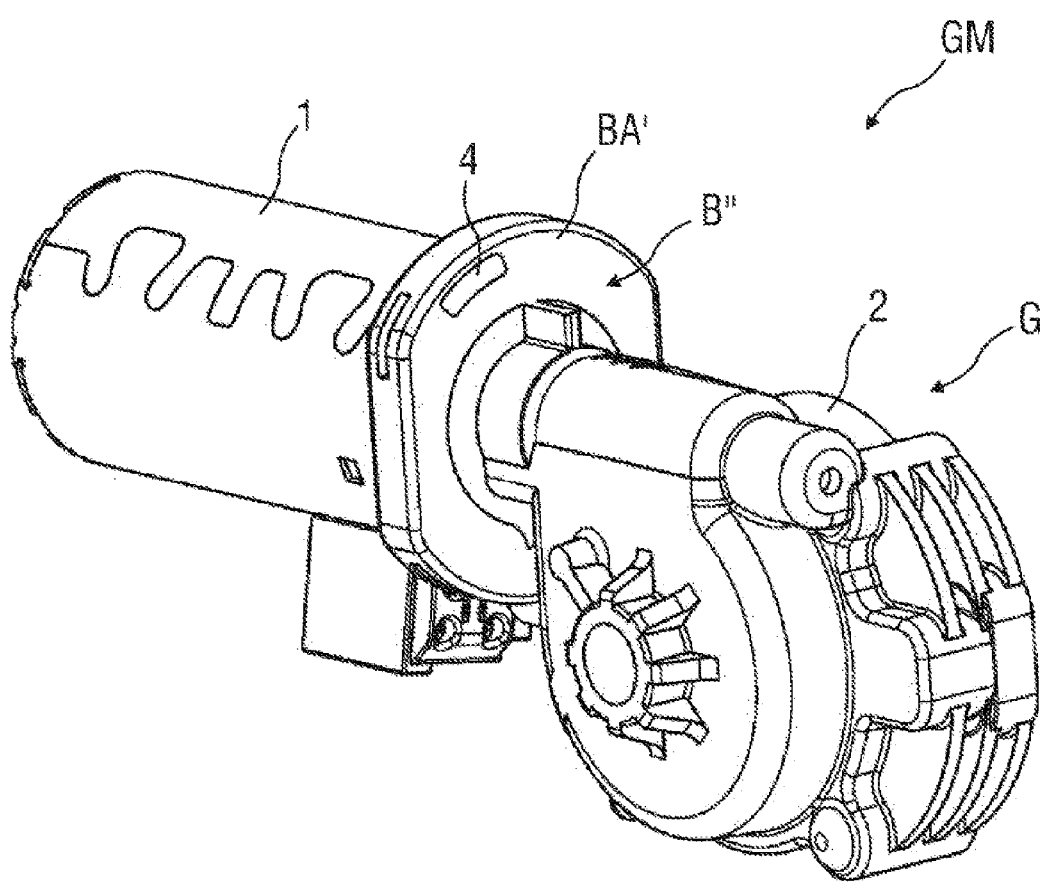
FIG. 25 is a schematic perspective view of the exemplary embodiment of FIG. 21.

FIG. 25 shows the gear unit G and the electric motor 1 with additional locking unit 4 pressed in, in the assembled and therefore locked state on account of the pressed-in locking unit 4. The locking unit 4 here is pressed into the locking component 2.4', especially into the flange collar 5, in the direction of the electric motor 1 according to the arrow direction s1 and therefore blocks the bayonet lock BA', especially the segments SG'.

While specific embodiments of the invention have been shown and described in detail to illustrate the application of the principles of the invention, it will be understood that the invention may be embodied otherwise without departing from such principles.

The invention claimed is:

1. A gear unit, comprising;
    at least one gear housing, comprising:
        a first surface facing a motor;
        a second surface, opposite said first surface;
        at least one locking component comprising a plurality of undercut apertures in said first surface,
    a motor locking element connected to said motor, said motor locking element having a plurality of circumferentially spaced, radially extending segments;
    wherein said plurality of undercut apertures are connected to respective undercuts in said first surface, wherein said undercuts do not extend through said second surface;
    a locking unit, comprising:
    an axially extending through hole formed in one of said plurality of said undercut apertures, said through hole extending through said second surface;
    a lock pin located in said through hole to block circumferential movement of at least one of said segments in at least one of said undercuts, said lock pin extending through said second surface.

2. The gear unit as claimed in claim 1, wherein the locking component is configured as a circumferential edge or flange collar, in which a number of undercuts are incorporated, in which the electric motor is lockable by a form fit or a force fit.

3. The gear unit as claimed in claim 1, wherein the at least one locking component is arranged on the at least one gear housing of the gear unit.

4. The gear unit as claimed in claim 1, wherein the locking component comprises a number of detent elements for interlocking the electric motor with the gear housing.

5. The gear unit as claimed in claim 1, wherein the motor locking element is configured to secure the electric motor immovably in the axial direction and prevented from twisting by a torque lock.

6. The gear unit as claimed in claim 1, wherein the at least one locking component comprises a radially outward protruding contour arranged at a front end of an electric motor housing.

7. The gear unit as claimed in claim 6, wherein a diameter of the contour is larger than an outer diameter of the electric motor housing.

8. The gear unit as claimed in claim 6, wherein a circumferential profile of the contour has said segments which are in each case spaced apart from each other in a circumferential direction.

9. The gear unit as claimed in claim 6, wherein the locking unit is designed as a separate element.

10. The gear unit as claimed in claim 1, wherein the locking component comprises a bayonet lock.

11. The gear unit as claimed in claim 1, wherein in an assembly step, the segments are located through the undercut apertures of the first surface, wherein the segments engage the undercuts in a locking manner by rotation of the motor locking elements.

12. The gear unit as claimed in claim 1, wherein in a locked state the lock pin is located between two segments of the motor locking element.

* * * * *